United States Patent Office 3,048,263
Patented Aug. 7, 1962

3,048,263
FOG RESISTANT POLYOLEFIN FILMS
William Sacks, Chicago Heights, and William F. Underwood, Oak Park, Ill., assignors to Union Carbide Corporation, a corporation of New York
No Drawing. Filed Mar. 29, 1961, Ser. No. 99,056
18 Claims. (Cl. 206—45.33)

This invention relates to the prevention of fogging of polyolefin film surfaces by condensed moisture, and more particularly relates to the prevention of moisture fogging on the surfaces of transparent, self-supporting polyolefin films employed in the packaging of moist food products.

Self-supporting polyolefin films, such as polyethylene film and polypropylene film, are characterized by high resistance to moisture vapor transmission. This property is of particular advantage in the packaging of moist foods with these films because the moisture content of the food is thereby substantially retained over long periods of time. Another desirable property of polyolefin films is their transparency, enabling easy visual identification of food products packaged in such films.

Qualitative evidence of polyolefin films' superior resistance to moisture vapor transmission is readily observed in the instance of fresh meats packaged in such films and stored in refrigerators maintained at temperatures above the freezing point of water. Often, within an hour after being packaged and stored, sufficient water evaporates from the meat surface to saturate the air spaces between the film and the meat, and then begins to condense on the inner surfaces of the polyolefin film as minute droplets of water. As more water droplets form on the inner polyolefin surfaces, an overall fogged effect is produced, interfering with visual identification of the meat or other packaged commodity.

Accordingly, it is an object of the present invention to impart to surfaces of polyolefin films resistance to moisture fogging.

Another object is to impart to self-supporting polyolefin films resistance to moisture fogging.

A further object is to provide melt-extrudable polyolefin compositions, heat-formable into clear, self-supporting films, and particularly characterized by their resistance to surface fogging by humid atmosphere.

The accomplishment of these objectives and others as will become apparent is hereinafter described.

It has now been found that the incorporation of specific amounts of an anti-fog agent including monoglycerides of a fat-forming fatty acid or mixtures of monoglycerides and diglycerides of fat-forming fatty acids wherein the active ingredient is the monoglycerides, in a film-forming polyolefin is unexpectedly effective in causing moisture condensing on the surfaces of a film formed from such composition to coalesce into a continuous visually clear film instead of forming a fogged surface comprising individual droplets of water.

As stated, when mixtures of monoglycerides and diglycerides are used to impart fog-resistance to the polyolefins the monoglycerides present in the mixture are the active ingredient; or in other words, it is the monoglycerides in such mixture which impart the fog resistance to the polyolefin film. For example, commercial mixtures of monoglycerides and diglycerides have been found to be effective as anti-fog agents wherein up to about 50% by weight of the mixture is a diglyceride or diglycerides. Moreover, it is to be noted "anti-fog agent" as herein used, means monoglycerides or mixtures of monoglycerides and diglycerides as well as mixtures of said glycerides and compounds for preventing moisture-fogging on polyolefin film surfaces set forth in copending United States patent applications: Serial No. 99,038, Serial No. 99,042, Serial No. 99,057, and Serial No. 99,058, all filed simultaneously herewith, and wherein said mixtures of glycerides and such compounds preferably have an "HLB" value from about 4 to 14 inclusive. Thus, the anti-fog agent incorporated in the polyolefin can include specified amounts of said glycerides or mixtures of said glycerides and the compounds set forth in the above-identified copending patent applications.

The term "HLB" as used herein is defined in the Journal of the Society of Cosmetic Chemists of 1949, pages 311 through 326; and the Journal of the Society of Cosmetic Chemists of 1954, pages 249 through 256. Briefly, the term "HLB" comes from the words "hydrophile-lipophile balance." The "HLB" method as described in the Journal of the Society of Cosmetic Chemists is a method which assigns numerical values to surfactants thereby providing a system of a classification that is related to their behavior and to their solubility in water. The "HLB" method is based on the premise that all surfactants combine hydrophilic and lipophilic groups in one molecule and that the proportion between the weight percentages of these two groups for non-ionic surfactants is an indication of the behavior that may be expected from the product.

The mixtures of glycerides and other compounds of the present invention preferably have an HLB value of from about 4 to 14. Mixtures having an HLB value of less than about 4 and more than about 14 do not impart optimum anti-fog properties to the film. Also, mixtures of compounds wherein the HLB value of each constituent is outside the specified range and the HLB value of said mixture is within the specified range, do not give desirable anti-fog properties to the film.

The term "fat-forming fatty acids" as herein used, is definitive of those fatty acids present as such or as glycerides in natural fats. The Yearbook of Agriculture, 1959 Food, U.S. Department of Agriculture, page 716, defines "fat" as follows:

"A glyceryl ester of fatty acids. Fats generally are substances of plant and animal origin. Fat may be in solid form, as butter, margarine, or other shortening, or in liquid form, as the vegetable oils."

The monoglycerides and mixtures of monoglycerides and diglycerides useful in the practice of this invention can be prepared by known procedures, as for example, by the glycerolysis of natural fats or oils, these being essentially mixtures of various fatty acid triglycerides. Upon glycerolysis of such oils or fats, there is usually obtained a complex mixture of alpha and beta monoglycerides, diglycerides, traces of triglycerides and free fatty acids. The components of such mixtures can be separated by suitable distillation procedures.

Illustrative examples of monoglycerides and mixtures of monoglycerides and diglycerides effective for the purposes of this invention are those obtained by the glycerolysis of such fats or oils as beef tallow, mutton tallow, butter fat, coconut oil, corn oil, cotton seed oil, lard oil, olive oil, peanut oil, soy bean oil, sesame oil and from their partial or fully hydrogenated derivatives.

In general, the commercially available monoglycerides, or mixtures of mono- and diglycerides of fat-forming fatty acids contain traces of preservatives, such as 1/100 of 1 percent by weight of butylated hydroxy anisole, 1/100 of 1 percent by weight of butylated hydroxy toluene, and 1/100 of 1 percent by weight of citric acid in a propylene glycol carrier added as preservatives. Commercially available products generally will also contain small traces of free glycerine, generally less than 1.5 percent, small traces of free fatty acids, generally less than 0.5 percent, and small traces of the triglycerides of fat-forming fatty acids.

The incorporation of the anti-fog agents comprising monoglycerides or mixtures of monoglycerides and diglycerides of fat-forming fatty acids wherein the monoglycerides are the active ingredient in polyolefin materials to impart thereto resistance to moisture fogging can be effected in several ways. In a preferred embodiment, the anti-fog agent is homogeneously incorporated into the polyolefin by heating them together to at least the melting point of the plastic material in a suitable mixing apparatus, such as a Banbury mixer or heated differential mixing rolls, until a homogeneous mixture is formed, solidifying the mixture by cooling and then comminuting the cooled mixture to a particle size satisfactory for hot-melt extrusion or equivalent heat-shaping operation to form films. It will be obvious to those skilled in the art that other methods can also be used to incorporate the anti-fog agent.

The incorporation of an anti-fog agent in the polyolefin material is preferred over other methods, such as coating the polyolefin material with the anti-fog agents, for several reasons. First, in using a coating, a need to find an adequate solvent is present. Moreover, as a matter of economics, the anti-fog agent can simply be incorporated in the polyolefin material by adding it in the processing of the raw polyolefin material; or by adding it to the polyolefin material at the time it is ready to form film. On the other hand, the coating containing an anti-fog agent must be applied after the polyolefin film is formed, thereby necessitating coating and solvent recovery equipment. Thus, overall processing costs are less when the anti-fog agent is incorporated into the polyolefin. Another important reason for preferring the incorporation of the anti-fog agent is that a coating containing an anti-fog agent may be wiped or washed off the polyolefin surfaces. Accordingly, the fog-resistance of the film is greatly impaired, causing an overall fogged effect to thereafter develop on the polyolefin film surfaces when employed as in packaging material, as herein described. In contrast, when the anti-fog agent is incorporated in the polyolefin film, it is generally believed some of the anti-fog agent will remain therein and not migrate to the film surfaces. Thus, when the migrated portion of the anti-fog agent is removed from the film surfaces, that which remains in the film will migrate to the film surfaces. In this manner, the film remains fog resistant, even upon removal of at least the initial portion of the anti-fog agent which has migrated to the film surfaces.

Film-forming polyolefins suitable for the present invention are particularly exemplified by low density polyethylene having a density from at least a film-forming grade to 0.935 gram per cubic centimeter at 25° C.; high density polyethylene of more than 0.935 gram per cubic centimeter at 25° C. and preferably from 0.94 to 0.98 gram per cubic centimeter at 25° C.; polypropylene having a density of at least about 0.88 gram per cubic centimeter at 25° C.; copolymers of ethylene and propylene; and polymers obtained from ethylene or propylene co-polymerized with minimal amounts of other mono-olefinic monomers such as butene, isobutylene, acrylic acids, esters of acrylic acids, styrene or combinations thereof such that the melting point of the final copolymer is not more than 10° C. different from the corresponding low density polyethylene homopolymer; or such that the crystallinity of the corresponding high density polyethylene or polypropylene homopolymer is not significantly lessened.

The anti-fog agent of the present invention is incorporated in the above-described film-forming polyolefins in an amount which imparts fog resistance to the film and not more than that which does not appear to further improve the anti-fog properties of the film and/or not more than that which adversely affects the other normally desired physical characteristics of the polyolefin films produced therefrom. It has been found that if an excess amount of anti-fog agent is incorporated in the polyolefin film, it tends to be tacky and has a greasy feel. The blocking and slip properties of the film are also adversely affected. Moreover, an excess of anti-fog agent in the film adversely affects the adhesion of inks thereto.

Thus, to produce about a 1 mil thick fog-resistant low density polyethylene film without adversely affecting its other normally desired properties, the anti-fog agent is added in amounts from about 0.5 percent to 1.0 percent by weight of the polyethylene and preferably from about 0.1 percent to 0.75 percent by weight of the polyethylene. Incorporation of less than about 0.05 percent by weight of the anti-fog agent into the polyethylene does not result in any appreciable improvement in the anti-fog properties of the films produced from those compositions. Incorporation of more than about 1.0 percent by weight of the anti-fog agent into the polyethylene does not appear to further improve the anti-fog properties of the films produced therefrom. In addition, the resultant film has a tendency to be tacky, and the feel, slip, blocking and ink adhesion properties of said film are adversely affected when more than about 1.0 percent by weight of the anti-fog agent is incorporated therein.

To impart fog-resisance to a 1 mil thick high density polyethylene film or polypropylene film without adversely affecting the other normally desired properties of the films from about 0.5 percent to 4.0 percent by weight of polyolefin and preferably from about 0.5 percent to 2.5 percent by weight of polyolefin of anti-fog agent can be incorporated into the high density polyethylene or polypropylene.

Optimumly, the concentration of the anti-fog agent in the film will vary with the thickness of the film. Since thinner films have a greater surface area per unit weight of film than do thicker films, a greater concentration of the anti-fog agent will be necessary to produce optimum results in thinner films than that necessary for thicker films. As an example of this, 0.1 to 0.2 percent by weight of polyethylene of the anti-fog agent in 1.5 mil low density polyethylene film produces excellent anti-fog characteristics, while 0.2 to 0.3 percent by weight of polyethylene of said anti-fog agent in 0.75 mil thick low density polyethylene film produces the same excellent results. The optimum concentration for each particular thickness of the film can be readily determined by simple empirical tests.

The normally added materials, such as fillers, stabilizers, plasticizers, colorants, slip agents, anti-blocking agents, anti-static, antioxidant and the like can be added to the compositions of this invention, provided, however, they are present in minimal amounts which will not offset the anti-fog characteristic improvements in these compositions.

Anti-fog compositions of this invention can be extruded into self-sustaining films or can be coated onto base films by any of the methods known to the art. Preferably, however, when seamless tubing is desired, the compositions are extruded by the blown-tube method disclosed in U.S.P. 2,461,975 to Fuller and U.S.P. 2,461,976 to Schenk. These methods comprise, in general, melt extruding the thermoplastic composition through an annular die in the form of a seamless tubing, drawing the tubing from the die, and thereafter cooling, flattening and winding the tubing on reels. A bubble of a gaseous medium is maintained within the tubing between the annular die and the flattening means to distend the tubing to the desired diameter. Sheeting can be made from the tubing by cutting either one or both of the longitudinal edges.

The resulting fog-resistant polyolefin films are transparent and can be biaxially oriented by any methods known to the art. Also, these films printed satisfactorily after suitable treatment of said film by methods known in the art, such as by subjecting the film to the action of corona discharge, flame treatment, chlorination, etc. Furthermore, such films can be heat sealed.

The following examples serve to further illustrate the invention, but are not to be construed in limitation thereof.

EXAMPLES 1–4

Ninety-nine parts by weight of polyethylene having a melt index of 2.0 and a density of 0.921 gram per cc. at 25° C. were placed on a differential two roll mill having a roll temperature of about 25° F. The ratio of the roll speeds was approximately 1.4 to 1 with the slower roll turning at about 20 r.p.m. The polyolefin was heated until softened and one part of a commercial mixture of mono- and diglycerides of fat-forming fatty acids obtained by the glycerolysis of a mixture of beef tallow and lard fat, the latter predominating, was added thereto, said mixture having the following description.

| | | |
|---|---|---|
| Melting point | Approx. 129° F.–135° F. | |
| Iodine value | Approx. 46–50. | |
| | | Test method |
| Monoglyceride content (alpha form) 54–58% | | Pohle & Mehlenbacher. |
| Total monoglycerides (alpha and beta forms) 65–69% | | J. B. Martin. |
| Free glycerine not over 1.5% | | Pohle & Mehlenbacher. |
| Free fatty acid (as oleic) not over 0.4% | | A.O.C.S. Ca–5a40. |
| Moisture, not over 0.4% | | A.O.C.S. Ca–2c–55. |
| Color, not over 5 | | Hess Ives. |
| Stabiliy, at least 50 hrs. | | A.O.M. |

Balance of contents: diglycerides and trace of triglyceride.

The polyethylene and the above-described glycerides were milled together on the heated differential two roll mill for approximately 30 minutes until a homogeneous mixture was obtained. The composition was removed from the mill, cooled, and cut to suitable particle size for melt extrusion. This composition was blended with additional polyethylene to the subsequently indicated concentration and film 0.75 mil in thickness was then formed by the blown-tube method set forth in U.S.P. 2,461,975. The tubular film was slit to form sheeting and the anti-fog properties determined as outlined below. As a control, the same polyethylene used in preparing these film compositions, but without the anti-fog agent, was melt extruded by the same method.

The test used to determine the anti-fog properties of the film was as follows. A 250 ml. beaker was filled to within ½ inch of the top with water at 120° F. A 4" x 4" piece of film was quickly fastened over the mouth of the beaker with a rubberband. Observations were made periodically (immediately, 1 hour and 24 hours) as to the nature of the water condensation on the inner surface of the film. The results are recorded in Table I.

Table I

| Example No. | Glyceride mixture concentration percent by weight | Film appearance | | |
|---|---|---|---|---|
| | | Immediately | 1 hour exposure | 24 hours exposure |
| Control | None | Extremely fine droplets—opaque. | Small droplets—opaque-translucent. | Small droplets—opaque-translucent. |
| 1 | 0.05 | Small droplets—hazy. | Clear | Clear. |
| 2 | 0.1 | Few large drops—clear. | do | Do. |
| 3 | 0.2 | One large drop—clear. | do | Do. |
| 4 | 0.4 | do | do | Do. |

EXAMPLES 5–7

Polyethylene films containing a homogeneously incorporated mixture of glycerides as described in Examples 1–4 were used to wrap fresh meat. Polyethylene film in the form of tubing containing the indicated concentrations of the mixture of mono- and diglycerides of fat-forming fatty acids was prepared as in Examples 1–4 and these films were used to wrap fresh round steak for refrigerated storage and as a control.

The procedure used was as follows. Round steaks ¾" in thickness were removed one at a time from a 40° F. cooler for packaging and placed into 1" x 5" x 8" pilot trays. The 1 inch dimension was the height of the side walls. The test film was supplied in the form of tubing and the meat package was inserted into the tubing so that the inside of the tubing was exposed to the meat surface. The packages were heat-sealed. The packaged samples were then placed in a refrigerator maintained at 40° F. to 42° F. The fogging or condensation on the inside of the fresh meat package was noted at varying intervals and the appearance rated as follows and shown in Table II.

| Rating No.: | Appearance |
|---|---|
| 1 | No condensation—meat clearly visible. |
| 2 | Very slight condensation—meat visible. |
| 3 | Slight condensation—meat visible. |
| 4 | Moderate condensation—meat visibility slightly impaired. |
| 5 | Heavy condensation—meat visibility impaired. |
| 6 | Very heavy condensation—meat not visible. |

Table II

| Ex. No. | Glyceride mixture concentration percent by weight | Time after packaging in hours | | | | | | | | | | |
|---|---|---|---|---|---|---|---|---|---|---|---|---|
| | | ½ | 1 | 2 | 3 | 4 | 5 | 6 | 22 | 24 | 26 | 29 | 30 |
| 5 | 0.4 | 1 | 1 | 1 | 1 | 1 | 1 | 1 | 1 | 1–2 | 1–2 | 1–2 | 2 |
| 6 | 0.2 | 1 | 2 | 2 | 3 | 3 | 3 | 3 | 3 | 3 | 3 | 3 | 3 |
| 7 | 0.1 | 2 | 3 | 3 | 4 | 4 | 4 | 4 | 4 | 4 | 3 | 3 | 3 |
| Control | None | 2 | 5 | 6 | 6 | 6 | 6 | 6 | 6 | 6 | 6 | 6 | 6 |

EXAMPLES 8–10

Polyethylene film made as in Examples 1–4 with the indicated concentrations of the mixture of mono- and diglycerides were used to package tomatoes.

The tomatoes equilibrated to room temperature were put into small plastic polystyrene cradles, three to each cradle, and wrapped in the polyethylene film. The packages were heat-sealed. The packages were then placed in a refrigerator maintained at 40° F.–42° F.

The results are shown in Table III.

Table III

| Ex. No. | Glyceride mixture concentration percent by weight | 15 minutes | 30 minutes | 4 hours |
|---|---|---|---|---|
| Control | None | Very hazy | Very hazy | Very hazy. |
| 8 | 0.1 | Moderate haze | Moderate haze | Moderate haze. |
| 9 | 0.2 | Clear | Clear | Clear. |
| 10 | 0.4 | do | do | Do. |

EXAMPLES 11–13

Various glycerides were homogeneously dispersed into film-forming polyethylene according to the procedure described in Examples 1–4. The resultant compositions were similarly melt-extruded into self-supporting films. The films were examined for their resistance to moisture fogging by the same test employed in Examples 1–4. The test results are tabulated in the subsequent table.

Table IV

| Ex. No. | Type of glyceride | Percent by weight glyceride in film | Film thickness (mils) | Film appearance |
|---|---|---|---|---|
| 11 | Mixture of monoglycerides. | 0.4 | 0.75 | Clear (15 minute exposure). |
| 12 | ----do---- | 0.4 | 0.75 | Do. |
| 13 | Glyceryl monostearate. | 0.4 | 0.75 | Do. |
| 14 | Glyceryl monopalmitate. | 0.4 | 1.5 | Clear (2-4 hour exposure). |
| 15 | Glyceryl monooleate. | 0.4 | 1.0 | Clear (immediately). |
| 16 | Glyceryl monolaurate. | 0.4 | 1.0 | Clear (5-minute exposure). |
| 17 | Glyceryl monopalmitate. | 0.1 | 1.5 | Clear (1-hour exposure). |
| 18 | Glyceryl monooleate. | 0.1 | 1.0 | Clear (immediately). |
| 19 | Glyceryl monolaurate. | 0.1 | 1.0 | Clear (10-minute exposure). |
| 20 | Mixtures of monoglycerides. | 0.4 | 0.75 | Clear (2-hour exposure). |
| 21 | Mixture of monoglycerides and diglycerides. | 0.4 | 0.75 | Do. |
| 22 | ----do---- | 0.4 | 0.75 | Clear (15-minute exposure). |
| 23 | ----do---- | 0.4 | 0.75 | Clear (2-hour exposure). |

The glycerides employed in the above examples were commercial products having the following properties.

The mixture of monoglycerides used in Example 11 was produced by the glycerolysis of fully hydrogenated lard, said mixture being about 65% by weight glyceryl monostearate and about 35% by weight glyceryl monopalmitate. Chemical and physical data of said mixture were as follows:

Monoester content _____ 90.0% minimum).
Saponification value _____ 155-165.
Iodine value _____ 1.
Glycerol content _____ 1.0% (maximum).
Free fatty acid (as stearic) _____ 1.5% (maximum).
Specific gravity _____ 0.96 at 75° C.
Congealing point _____ 60° C. (approx.).
Clear point _____ 73° C. (approx.).
Balance of contents: diglycerides and trace of triglyceride The mixture of monoglycerides used in Example 12 contained approximately 63% by weight glyceryl monostearate, 35% by weight glyceryl monopalmitate and 2% by weight of glyceryl monomyristate.

The glyceryl monostearate employed in Example 12 had the following chemical and physical properties:

Monoester content _____ 90.0% (minimum).
Saponification value _____ 158-168.
Iodine value _____ 3 (maximum).
Glycerol content _____ 1.5% (maximum).
Free fatty acid content _____ 2.5% (maximum).
Specific gravity _____ 0.96 at 75° C.
Congealing point _____ 66° C. (approx.).
Clear point _____ 73° C. (approx.).
Balance of contents: diglycerides and trace of triglycerides The mixture of monoglycerides used in Example 20 was a commercial mixture of about 93% by weight glyceryl monostearate and 7% by weight of glyceryl monopalmitate, having the following chemical and physical properties:

Monoester content _____ 90.0% (minimum).
Saponification value _____ 155-165.
Iodine value _____ 3 (maximum).
Glycerol content _____ 1% (maximum).
Free fatty acid (as stearic) _____ 1.5% (maximum).
Specific gravity _____ 0.94 at 75° C.
Congealing point _____ 69° C. (approx.).
Clear point _____ 78° C. (approx.).
Balance of contents: diglycerides and trace of triglycerides The mixture of monoglycerides and diglycerides used in Example 21 was obtained by the glycerolysis of hydrogenated tallow, said mixture containing by weight not more than $\frac{1}{100}$ of 1% butylated hydroxyanisole, $\frac{1}{100}$ of 1% butylated hydroxytoluene, and $\frac{1}{100}$ of 1% citric acid in propylene glycol added as preservatives. Properties of this mixture were as follows:

Melting point _____ 141° F.-144° F.
Iodine value _____ Less than 2.

Test method

Monoglyceride content (alpha form) 52-56% _____ Pohle and Mehlenbacher.
Total monoglycerides (alpha and beta forms) 61-66% __ J. B. Martin.
Free glycerine, not over 1.5% _____ Pohle and Mehlenbacher.
Free fatty acid (as oleic) not over 0.5% _____ A.O.C.S. Ca-5a-40.
Moisture, not over 0.5% ____ A.O.C.S. Ca-2e-55.
Color, not over 5 _____ Hess-Ives.
Balance of contents: diglycerides and trace of triglycerides The mixture of monoglycerides and diglycerides used in Example 22 was produced by the glycerolysis of prime stearin lard and contained the same preservatives as described supra for Example 21. Properties of this mixture were as follows:

Melting point _____ Approx. 115° F.-122° F.
Iodine value _____ Approx. 56-64.

Test method

Monoglyceride content (alpha form) 40-44% _____ Pohle and Mehlenbacher.
Free glycerine, not over 0.6% _____ Do.
Free fatty acid (as oleic) not over 0.4% _____ A.O.C.S. Ca-5a-40.
Moisture, not over 0.4% ____ A.O.C.S. Ca-2e-55.
Color, not over 2 _____ Hess-Ives.
Stability, at least 50 hrs _____ A.O.M.
Water, at least 600% _____ Cereal Sci.Today, 1, 42 (1956).
Absorption [1]
Balance of contents: diglycerides and trace of triglycerides.

[1] Tested at 2½% alpha mono in standard shortening.

The mixture of monoglycerides and diglycerides used in Example 23 was produced by glycerolysis of hydrogenated soy bean oil. It contained the same amount and kind of preservatives described with respect to the glycerides used in Examples 21 and 22. The properties of said mixture were as follows:

Melting _____ Approx. 138° F.-142° F.
Iodine value _____ Approx. less than 8.

Test method

Monoglyceride content (alpha form) 40-44 _____ Pohle and Mehlenbacher.
Free glycerine, not over 1% __ Do.
Free fatty acid (as oleic) not over 0.5% _____ A.O.C.S. Ca-5a-40.
Moisture, not over 0.5% ____ A.O.C.S. Ca-2e-55.
Color, not over 5 _____ Hess-Ives.
Balance of contents: diglycerides content and trace of triglyceride.

EXAMPLE 24

The procedure of Examples 1 to 4 was repeated except that 0.4% by weight of the anti-fog agent of such examples was homogeneously incorporated in polyethylene having a melt index of 2.0 and a density of 0.930 gram per cc. at 25° C. The resultant composition was similarly extruded into a self-supporting film. The film was examined for its resistance to moisture fogging by the same test employed in Examples 1-4. The film had a clear appearance after a 15 minute exposure.

EXAMPLE 25

The procedure of Examples 1 to 4 was repeated except that 1.0 percent by weight of the anti-fog agent of such examples was homogeneously incorporated in polyethylene having a melt index of 0.9 and a density of 0.950 gram per cc. at 25° C. The resultant composition was similarly extruded into a self-supporting film. The film was examined for its resistance to moisture fogging by the same test employed in Examples 1–4. The film had a clear appearance after a 4 hour exposure.

EXAMPLE 26

The procedure of Examples 1 to 4 was repeated except that 0.5 percent by weight of glycerol mono-oleate was homogeneously incorporated in polypropylene having a melt index of 5.0 and a density of 0.89 gram per cc. at 25° C. The resultant composition was similarly extruded into a self-supporting film. The film was examined for its resistance to moisture fogging by the same test employed in Examples 1–4. The film had a clear appearance after a 30 minute exposure.

EXAMPLE 27

The procedure of Examples 1 to 4 was repeated except that 1.0 percent by weight of glyceryl mono-oleate was homogeneously incorporated in polypropylene having a melt index of 5.0 and a density of 0.89 gram per cc. at 25° C. The resultant composition was similarly extruded into a self-supporting film. The film was examined for its resistance to moisture fogging by the same test employed in Examples 1–4. The film had a clear appearance after a 1 hour exposure.

Thus the foregoing clearly shows that the incorporation of specific amounts of the anti-fog agents herein described in polyolefin imparts fog resistance properties to the film made from such composition.

In addition to imparting fog-resistance to the films, the anti-fog agents of the present invention do not adversely affect the transparency thereof. Accordingly, these polyolefin films are admirably suited for packaging or containing fresh meats, vegetables, flowers and other moisture-emitting products without interfering with visual identification of the packaged commodity because the polyolefin films are transparent and because water droplets condensing on the inside of the polyolefin packaging material will be coalesced into a clear visual film.

As described herein, the invention is of special utility in improving the resistance to fogging of self-supporting polyolefin films as particularly exemplified by polyethylene and polypropylene. It will be appreciated by those skilled in the art that the glyceride or mixtures thereof as herein described and contemplated can also be incorporated into a polyolefin coating composition and the polyolefin coating composition applied to a base surface: as for example, incorporating the anti-fog agent into a polyethylene coating composition and melt-extruding the coating compositions onto a regenerated cellulose substrate film by methods known to those in the art.

What is claimed is:

1. A film-forming composition comprising a homogeneous mixture of a polyolefin and an anti-fog agent including a monoglyceride of a fat-forming fatty acid, said anti-fog agent being present in an amount imparting resistance to moisture fogging and less than that imparting tackiness to a polyolefin film formed from said film-forming composition.

2. A film-forming composition comprising a homogeneous mixture of a polyolefin and a member selected from the group consisting of a monoglyceride of a fat-forming fatty acid and a mixture of a monoglyceride and a diglyceride of fat-forming fatty acids, said monoglyceride being present in an amount imparting resistance to moisture fogging and less than that imparting tackiness to a polyolefin film formed from said film-forming composition.

3. A film-forming composition comprising a homogeneous mixture of a polyolefin material selected from the group consisting of low density polyethylene, high density polyethylene and polypropylene, and an anti-fog agent including monoglycerides of fat-forming fatty acids, said anti-fog agent being present in an amount imparting resistance to moisture fogging and not more than about 1.0 percent be weight of polyolefin in the instance of low density polyethylene and not more than about 4.0 percent by weight of polyolefin in the instance of high density polyethylene and polypropylene.

4. A film-forming composition comprising a homogeneous mixture of a polyolefin material selected from the group consisting of low density polyethylene, high density polyethylene and polypropylene, and a member selected from the group consisting of monoglycerides of fat-forming fatty acids and mixtures of monoglycerides and diglycerides of fat-forming fatty acids, said monoglycerides being present in an amount imparting resistance to moisture fogging and not more than about 1.0 percent by weight of polyolefin in the instance of low density polyethylene and not more than about 4.0 percent by weight of polyolefin in the instance of high density polyethylene and polypropylene.

5. A film-forming composition according to claim 4 wherein the monoglycerides consist of glyceryl monostearate.

6. A film-forming composition according to claim 4 wherein the monoglycerides consist of glyceryl monopalmitate.

7. A film-forming composition according to claim 4 wherein the monoglycerides consist of glyceryl monooleate.

8. A film-forming composition according to claim 4 wherein the monoglycerides consist of glyceryl monolaurate.

9. A film-forming composition according to claim 4, wherein the mixtures of monoglycerides and diglycerides contain up to about 50% by weight of said mixture of said diglycerides.

10. A transparent polyolefin film having homogeneously dispersed therein an anti-fog agent comprising monoglycerides, said anti-fog agent being present in an amount to impart resistance to moisture fogging and less than that imparting tackiness to said film.

11. A transparent self-supporting polyolefin film resistant to fogging upon exposure to a humid atmosphere, said film having homogeneously dispersed therein a member selected from the group consisting of monoglycerides of fat-forming fatty acids and mixtures of monoglycerides and diglycerides of fat-forming fatty acids, said monoglycerides being present in an amount imparting resistance to moisture fogging and less than that imparting tackiness to said film.

12. A transparent polyolefin film resistant to fogging upon exposure to a humid atmosphere, wherein said polyolefin is selected from the group consisting of low density polyethylene, high density polyethylene and polypropylene, said film having homogeneously dispersed therein an anti-fog agent including monoglycerides of a fat-forming fatty acid, said anti-fog agent being present in an amount imparting resistance to moisture fogging and not more than about 1.0 percent by weight of polyolefin in the instance of low density polyethylene and not more than about 4.0 percent by weight of polyolefin in the instance of high density polyethylene and polypropylene.

13. A transparent self-supporting polyolefin film resistant to fogging upon exposure to a humid atmosphere wherein said polyolefin is selected from the group consisting of low density polyethylene, high density polyethylene and polypropylene, said film having homogeneously dispersed therein a member selected from the group consisting of monoglycerides of fat-forming fatty acids and a mixture of monoglycerides and diglycerides of fat-forming fatty acids, said monoglycerides being present in an amount imparting resistance to moisture fogging and not more than about 1.0 percent by weight of polyolefin in the instance of low density polyethylene and not more than about 4.0 percent by weight polyolefin in the instance of high density polyethylene and polypropylene.

14. A package which contains a water emitting material and is formed of a polyolefin wrapping film having homogeneously dispersed therein an anti-fog agent comprising monoglycerides, said anti-fog agent being present in an amount to impart resistance to moisture fogging and less than that which imparts tackiness to said film.

15. A package which contains a water emitting material and is formed of a polyolefin wrapping film having dispersed therein a member selected from the group consisting of monoglycerides of fat-forming fatty acids and mixtures of monoglycerides and diglycerides of fat-forming fatty acids, said monoglycerides being present in an amount imparting resistance to moisture fogging and less than that which imparts tackiness to said film.

16. A package which contains a water emitting material and is formed of a polyolefin wrapping film wherein said polyolefin is selected from the group consisting of low density polyethylene, high density polyethylene and polypropylene, and has homogeneously incorporated therein an anti-fog agent including monoglycerides, said anti-fog agent being present in an amount imparting resistance to moisture-fogging and not more than about 1.0 percent by weight of polyolefin in the instance of low density polyethylene and not more than about 4.0 percent by weight of polyolefin in the instance of high density polyethylene and polypropylene.

17. A package which contains a water emitting material and is formed of low density polyethylene wrapping film having homogeneously dispersed therein a member selected from the group consisting of monoglycerides of fat-forming fatty acids and mixtures of monoglycerides and diglycerides of fat-forming fatty acids, said monoglycerides being present in an amount from about 0.05 percent to 1.0 percent by weight of polyethylene to impart to said polyethylene film resistance to moisture fogging.

18. A package which contains a water-emitting material and is formed of a polyolefin wrapping film selected from the group consisting of high density polyethylene and polypropylene having homogeneously dispersed therein a member selected from the group consisting of monoglycerides of fat-forming fatty acids and mixtures of monoglycerides and diglycerides of fat-forming fatty acids, said monoglycerides being present in an amount from about 0.5 percent to 4.0 percent by weight of polyolefin to impart to said polyolefin film resistance to moisture fogging.

References Cited in the file of this patent

UNITED STATES PATENTS

| | | |
|---|---|---|
| 2,118,262 | McGrady et al. | May 24, 1938 |
| 2,372,171 | Bennett | Mar. 27, 1945 |
| 2,561,010 | Carson | July 17, 1951 |

FOREIGN PATENTS

| | | |
|---|---|---|
| 27,851 | Sweden | Dec. 4, 1909 |
| 567,360 | Great Britain | Feb. 12, 1945 |
| 1,140,943 | France | Mar. 11, 1957 |
| 1,075,495 | Germany | Feb. 11, 1960 |

UNITED STATES PATENT OFFICE
CERTIFICATE OF CORRECTION

Patent No. 3,048,263                      August 7, 1962

William Sacks et al.

It is hereby certified that error appears in the above numbered patent requiring correction and that the said Letters Patent should read as corrected below.

Column 4, line 8, for "0.5" read -- 0.05 '--.

Signed and sealed this 7th day of May 1963.

(SEAL)
Attest:

ERNEST W. SWIDER                      DAVID L. LADD
Attesting Officer                      Commissioner of Patents